(12) United States Patent
Hinoki et al.

(10) Patent No.: US 11,142,483 B2
(45) Date of Patent: Oct. 12, 2021

(54) SILICON CARBIDE FIBER REINFORCED SILICON CARBIDE COMPOSITE MATERIAL

(71) Applicant: Kyoto University, Kyoto (JP)

(72) Inventors: Tatsuya Hinoki, Kyoto (JP); Kazuya Shimoda, Kyoto (JP)

(73) Assignee: Kyoto University, Kyoto (JP)

( * ) Notice: Subject to any disclaimer, the term of this patent is extended or adjusted under 35 U.S.C. 154(b) by 0 days.

(21) Appl. No.: 15/534,236

(22) PCT Filed: Dec. 11, 2015

(86) PCT No.: PCT/JP2015/084858
§ 371 (c)(1),
(2) Date: Jul. 28, 2017

(87) PCT Pub. No.: WO2016/093360
PCT Pub. Date: Jun. 16, 2016

(65) Prior Publication Data
US 2017/0341986 A1 Nov. 30, 2017

(30) Foreign Application Priority Data
Dec. 12, 2014 (JP) .............................. JP2014-251734

(51) Int. Cl.
*C04B 35/80* (2006.01)
*C04B 35/565* (2006.01)
(Continued)

(52) U.S. Cl.
CPC ............ *C04B 35/806* (2013.01); *B32B 18/00* (2013.01); *C04B 35/565* (2013.01);
(Continued)

(58) Field of Classification Search
CPC ... C04B 35/806; C04B 35/565; C04B 35/571; C04B 35/573; C04B 35/575; C04B 35/5755
See application file for complete search history.

(56) References Cited

U.S. PATENT DOCUMENTS 5,762,863 A * 6/1998 Kameda ................ C04B 35/573
264/640
5,962,103 A 10/1999 Luthra et al.
(Continued)

FOREIGN PATENT DOCUMENTS

EP 0798281 A2 10/1997
JP S64 87581 A 3/1989
(Continued)

OTHER PUBLICATIONS

Khan, et al., "Microstructure of environmental barrier mullite and erbium silicate coatings on SiC-fiber bonded composites", Key Engineering Materials, vol. 287 (2005) pp. 471-476.
(Continued)

*Primary Examiner* — Karl E Group
(74) *Attorney, Agent, or Firm* — Cesari & McKenna, LLP

(57) ABSTRACT

The present invention provides a silicon carbide fiber reinforced silicon carbide composite material, which is a composite material of SiC fibers and SiC ceramics with improved toughness and can be produced with high yield by relatively simple steps without complex steps such as a step of oxidation-resistant coating or an advanced interface control step. The silicon carbide composite material comprises a multiphase matrix and silicon carbide fibers disposed in the matrix, the matrix containing a silicon carbide phase and a phase that includes a substance of low reactivity with respect to silicon carbide. It can be obtained by steps suitable for mass production and ensures greatly improved fracture
(Continued)

particle-dispersed CVI-SiC composite material toughness while maintaining the excellent properties of SiC ceramics.

12 Claims, 4 Drawing Sheets

(51) Int. Cl.
*C04B 35/628* (2006.01)
*B32B 18/00* (2006.01)
*C04B 35/573* (2006.01)

(52) U.S. Cl.
CPC ...... *C04B 35/573* (2013.01); *C04B 35/62863* (2013.01); *C04B 35/62884* (2013.01); *C04B 35/80* (2013.01); *C04B 2235/3208* (2013.01); *C04B 2235/3224* (2013.01); *C04B 2235/3225* (2013.01); *C04B 2235/3241* (2013.01); *C04B 2235/3244* (2013.01); *C04B 2235/3427* (2013.01); *C04B 2235/386* (2013.01); *C04B 2235/3813* (2013.01); *C04B 2235/3826* (2013.01); *C04B 2235/3839* (2013.01); *C04B 2235/3886* (2013.01); *C04B 2235/422* (2013.01); *C04B 2235/5244* (2013.01); *C04B 2235/616* (2013.01); *C04B 2235/80* (2013.01); *C04B 2237/363* (2013.01); *C04B 2237/38* (2013.01)

(56) References Cited

U.S. PATENT DOCUMENTS

| | | | |
|---|---|---|---|
| 6,074,750 A | 6/2000 | Brun et al. | |
| 6,331,496 B2* | 12/2001 | Nakayasu | C04B 35/565 501/85 |
| 7,404,922 B2* | 7/2008 | Kohyama | C04B 35/571 264/641 |
| 8,236,718 B1* | 8/2012 | Kepley | C04B 35/571 428/293.4 |
| 2001/0008865 A1* | 7/2001 | Nakayasu | C04B 35/565 501/88 |
| 2004/0192534 A1* | 9/2004 | Nixon | C04B 35/565 501/95.2 |
| 2010/0130344 A1* | 5/2010 | Mikijelj | C04B 35/5603 501/91 |
| 2011/0071013 A1 | 3/2011 | Newton et al. | |
| 2016/0102022 A1* | 4/2016 | Chamberlain | C04B 35/565 423/263 |
| 2017/0029340 A1* | 2/2017 | Weaver | C04B 35/80 |

FOREIGN PATENT DOCUMENTS

| | | | |
|---|---|---|---|
| JP | H01 298073 A | | 12/1989 |
| JP | H03 115140 A | | 5/1991 |
| JP | H09 67165 A | | 3/1997 |
| JP | H09 87029 A | | 3/1997 |
| JP | H1149570 A | | 2/1999 |
| JP | H11 217267 A | | 8/1999 |
| JP | 2001 158673 A | | 6/2001 |
| JP | 2002 255650 A | | 9/2002 |
| JP | 2002 356381 A | | 12/2002 |
| JP | 2007015901 A | * | 1/2007 |
| JP | 2010 070421 A | | 4/2010 |
| WO | WO2012 063923 A1 | | 5/2012 |
| WO | WO-2014/150394 A2 | | 9/2014 |

OTHER PUBLICATIONS

Yu, et al., "The behavior of coatings and $SiC_f$/SiC composites under thermal shock", Journal of Nuclear Materials, 283-287 (2000) 1077-1080.

Office Action issued in European Application No. 15 867 739.3, dated Jul. 10, 2019.

Partial Search Report issued in European Application No. 19 168 417.4, dated Jul. 15, 2019.

Notice of Reasons for Refusal issued in Japanese Patent Application No. 2020-059,875 dated Mar. 23, 2021.

* cited by examiner mechanism of improving fracture toughness particle-dispersed CVI-SiC composite material Fig. 6  Microtissue and tensile stress characteristics of BN particle-dispersed SiC composite material after exposure to 1500°C and annealing in the air

SILICON CARBIDE FIBER REINFORCED SILICON CARBIDE COMPOSITE MATERIAL

CROSS REFERENCE TO RELATED APPLICATIONS

This application is the National Stage of International Application No. PCT/JP2015/084858, filed on Dec. 11, 2015, which claims priority to Japanese Application No. 2014-251,734, filed Dec. 12, 2014. The contents of both applications are hereby incorporated by reference in their entirety.

TECHNICAL FIELD

The present invention relates to a silicon carbide fiber reinforced silicon carbide composite material (SiC/SiC composite material), and production methods thereof.

BACKGROUND ART

Ceramic materials made of SiC (silicon carbide) have excellent properties including light weight, heat resistance (high-temperature strength), wear resistance (high hardness), chemical stability (oxidation resistance, corrosion resistance), high thermal conductivity, low thermal expansion coefficient, reduction in induced radiation, and low decay heat.

And ceramic materials made of SiC (silicon carbide) have been used as heat-resistant and environmentally resistant materials relying on such excellent basic properties.

Further, in the field of nuclear energy, application of SiC ceramics to a fuel-cladding tube or the like so as to decrease the risk of phreatic explosion has been considered.

However, using SiC ceramics as a structural body poses a vulnerability issue, which is a disadvantage particular to ceramic materials; cracks are easily generated by impact or the like. Thus, solving this problem has been a major objective.

As a method for alleviating the vulnerability of SiC ceramics, a method of combining SiC ceramics with silicon carbide (SiC) long fibers having high strength and high rigidity, thereby improving their toughness, has been attempted.

However, since SiC ceramics and SiC fibers are made of the same material and therefore have a strong binding force with respect to each other, simply combining them to form a complex poses a problem such that, if cracks are generated on the matrix, the cracks will propagate to the SiC long fiber, thus easily causing brittle fracture.

In view of this problem, control of the propagation of the cracks by forming an interfacial phase between SiC ceramics and SiC fibers has been attempted (see Non-Patent Documents 1 and 2, etc.).

FIG. 1 is a schematic view showing a mechanism of improving fracture toughness by forming an interfacial phase between SiC ceramics and SiC fibers.

In this method, cracks are deflected in the interface between SiC ceramics and SiC fibers; further, the frictional force generated in the interface makes it possible to bear the load, thereby increasing fracture toughness.

To form an interfacial phase, for example, a method of coating a molded article of SiC long fibers with a carbon material, such as thermally decomposing carbon, has been attempted.

However, since the usage environment in industrial fields such as the energy industry or astronautical engineering is becoming more severe, a material that endures a high temperature of greater than 1000° C. has been demanded.

When a composite material provided with an interfacial phase made of a carbon material is used under a high-temperature oxidizing atmosphere, the carbon material is oxidized into a gas such as CO or $CO_2$; as a result, the solid phase of the interface disappears and the strength decreases, thereby causing difficulty in exerting the original characteristics.

Therefore, in order to improve the oxidation resistance of a SiC composite material, providing an environmental barrier coating of SiC or the like to the SiC composite material has been attempted.

However, in this method, the environmental barrier characteristics cannot be retained if the coating is damaged; that is, the entire strength inevitably relies on the coating strength.

Further, residual stress generated between the coating material and the SiC composite material, which is the matrix, due to a difference in the thermal expansion coefficient may cause a decrease in the entire strength characteristics.

Instead of forming a carbon material, a method of forming an interfacial phase of boron nitride (BN) between SiC ceramics and SiC fibers has also been attempted (see Patent Document 1 below).

BN is superior in oxidation resistance to a carbon material, and is expected to inhibit the degradation due to oxidation during use under a high-temperature oxidizing atmosphere.

However, in the method of forming an interfacial phase between SiC ceramics and SiC fibers, the thickness of the interfacial phase greatly affects the strength of the composite material.

Therefore, control of the thickness of the interfacial phase is an important objective.

To form an interfacial phase on the surface of SiC fibers, the CVD method, in which thickness control is relatively easy, has been mainly used.

When an interfacial phase is formed using the CVD method, generally, a method of molding bundles of SiC fibers into a shape similar to the final shape of the composite material, and then supplying a gas material to form an interfacial phase on the surface of the SiC fibers, has been performed.

In this method, if the molded article of SiC fibers has a small shape, the thickness control of the interfacial phase is relatively simple; however, when the molded article of SiC fibers has a large shape, the thickness of the interfacial phase tends to vary depending on the position of the fibers of the molded article because of the influence of the gas-material-introduction method.

Such a difficulty in thickness control of the interfacial phase makes the production process complicated, and also increases the frequency of defective-product generation, thus increasing the costs due to a decrease in product yield.

CITATION LIST

Patent Documents

Patent Document 1: JPH03-115140A

Non-Patent Documents

Non-patent Document 1: Journal of Nuclear Materials, 283-287 (2000), pp. 1077-1080

Non-patent Document 2: Key Engineering Materials, Vol. 287 (2005), pp. 471-476

SUMMARY OF INVENTION

Technical Problem

The present invention was made in light of the thus-described existing circumstances of prior art, and an object of the present invention is to provide a novel silicon carbide fiber reinforced silicon carbide composite material (hereinafter may also be referred to as "a SiC/SiC composite material").

A SiC/SiC composite material is a composite material of SiC fibers and SiC ceramics with improved toughness that can be produced with high yield by a relatively simple production step, without requiring complex production steps such as a step of oxidation-resistant coating or an advanced interface control step.

Solution to Problem

The inventors of the present invention have conducted extensive research to attain the above object.

As a result of the research, the inventors found that a composite material having a structure in which SiC fibers are disposed in a matrix of a multiphase ceramic material containing a SiC phase and a second phase comprising a substance having low reactivity with respect to SiC under the environment of production steps ensures greatly improved fracture toughness while maintaining the excellent properties of SiC ceramics.

And the inventors found that, in particular, when the second phase is made of a substance having a high temperature oxidation resistance, such as a boron nitride (BN), the composite material maintains high strength even in use under a high-temperature oxidizing atmosphere.

The inventors further found that, compared with the previously known method for forming an interfacial phase on the surface of SiC fibers, the method for obtaining a composite material having the above structure does not require an advanced interface control step, thereby significantly increasing the yield and productivity.

And the inventors further found that therefore, the method is very advantageous in terms of industrial use of SiC/SiC composite materials.

The present invention was completed by conducting further research based on these findings.

More specifically, the present invention provides the silicon carbide fiber reinforced silicon carbide composite materials, and methods for producing the composite materials, as detailed below.

Item 1. A silicon carbide fiber reinforced silicon carbide composite material, comprising a multiphase matrix containing a silicon carbide phase and a phase comprising a substance having low reactivity with respect to silicon carbide; and silicon carbide fibers disposed in the matrix.

Item 2. The silicon carbide fiber reinforced silicon carbide composite material according to Item 1, wherein the matrix has a structure in which the phase comprising a substance having low reactivity with respect to silicon carbide is dispersed in the form of particles in the matrix, or a structure in which the silicon carbide phase and the phase comprising a substance having low reactivity with respect to silicon carbide are present at random in the form of non-uniform-shaped agglomerates in the matrix.

Item 3. The silicon carbide fiber reinforced silicon carbide composite material according to Item 1 or 2, wherein the substance having low reactivity with respect to silicon carbide is at least one member selected from the group consisting of carbon, nitrides, oxides, carbides, borides, and, silicates.

Item 4. The silicon carbide fiber reinforced silicon carbide composite material according to any one of Items 1 to 3, wherein the substance having low reactivity with respect to silicon carbide is at least one member selected from the group consisting of carbon, boron nitride (BN), tantalum nitride (TaN), $Cr_2O_3$, $ZrO_2$, $HfO_2$, CaO, ZrC, NbC, HfC, $TiB_2$, $ZrB_2$, $CrB_2$, $Y_2SiO_5$, $Yb_2SiO_5$, and $Yb_2Si_2O_7$.

Item 5. The silicon carbide fiber reinforced silicon carbide composite material according to any one of Items 1 to 4, wherein the proportion of the silicon carbide phase is 20 to 90 volume % based on the entire matrix.

Item 6. The silicon carbide fiber reinforced silicon carbide composite material according to any one of Items 1 to 5, wherein the silicon carbide fibers are silicon carbide long fibers.

Item 7. The silicon carbide fiber reinforced silicon carbide composite material according to any one of Items 1 to 6, wherein the content percentage of the silicon carbide fibers is 20 to 90 volume % based on the entire composite material.

Item 8. A method for producing a silicon carbide fiber reinforced silicon carbide composite material, comprising dispersing silicon carbide powder and powder of a substance having low reactivity with respect to silicon carbide in a dispersion medium to obtain a slurry; applying the slurry to a fiber structure of silicon carbide fibers to obtain a mixture; and then sintering the mixture under elevated pressure.

Item 9. A method for producing a silicon carbide fiber reinforced silicon carbide composite material, comprising dispersing silicon carbide powder and powder of a substance having low reactivity with respect to silicon carbide in a dispersion medium to obtain a slurry; disposing bundled silicon carbide fibers in the slurry to obtain a mixture; and then sintering the mixture under elevated pressure.

Item 10. A method for producing a silicon carbide fiber reinforced silicon carbide composite material, comprising drying a slurry containing silicon carbide powder and powder of a substance having low reactivity with respect to silicon carbide and molding into a sheet; forming a laminate by laminating thereon a fiber structure made of silicon carbide fibers or a layer in which bundled silicon carbide fibers are disposed; and then sintering the laminate under elevated pressure.

Item 11. A method for producing a silicon carbide fiber reinforced silicon carbide composite material, comprising disposing a silicon carbide fiber aggregate in a reactor; supplying a mixed gas for vapor deposition containing a silicon carbide precursor gas for forming a silicon carbide phase and a second phase-forming precursor gas for forming a phase comprising a substance having low reactivity with respect to silicon carbide to the reactor; and heating the mixed gas for vapor deposition to a temperature at which both the silicon carbide precursor gas for forming the silicon carbide phase and the second phase-forming precursor gas undergo thermal decomposition, thereby vapor-depositing on the surfaces of the silicon carbide fibers the silicon carbide and the substance having low reactivity with respect to silicon carbide.

Item 12. A method for producing a silicon carbide fiber reinforced silicon carbide composite material, comprising dispersing a matrix-forming material containing powder containing a carbon component, Si powder, and powder of a substance having low reactivity with respect to silicon carbide in a dispersion medium to obtain a slurry; mixing the slurry with SiC fibers to obtain a mixture used for reaction sintering; and then heating the mixture to a temperature equal to or greater than the melting point of silicon.

Item 13. The method for producing a silicon carbide fiber reinforced silicon carbide composite material according to Item 12, wherein the matrix-forming material further comprises SiC powder.

Advantageous Effects of Invention

As described above, the SiC/SiC composite material of the present invention is a material that ensures improved SiC ceramics toughness by being combined with SiC fibers.

The material of the present invention has a high strength comparable to a material in which an interfacial phase of boron nitride fiber, a carbon material or the like is formed between the fibers and the matrix.

Moreover, since the second phase is prevented from oxidation even under a high-temperature oxidizing atmosphere, the material of the present invention ensures superior durability.

Further, since an interfacial phase is not present between SiC fibers and the matrix in the SiC/SiC composite material of the present invention, an advanced interface control step, which is a major problem in practical use and mass production, is not necessary, thereby significantly increasing yield and productivity.

Therefore, the SiC/SiC composite material of the present invention can solve the drawbacks of previously known SiC ceramics, and is thus very useful as a material suitable for industrial use.

DESCRIPTION OF EMBODIMENTS

Figure 1:
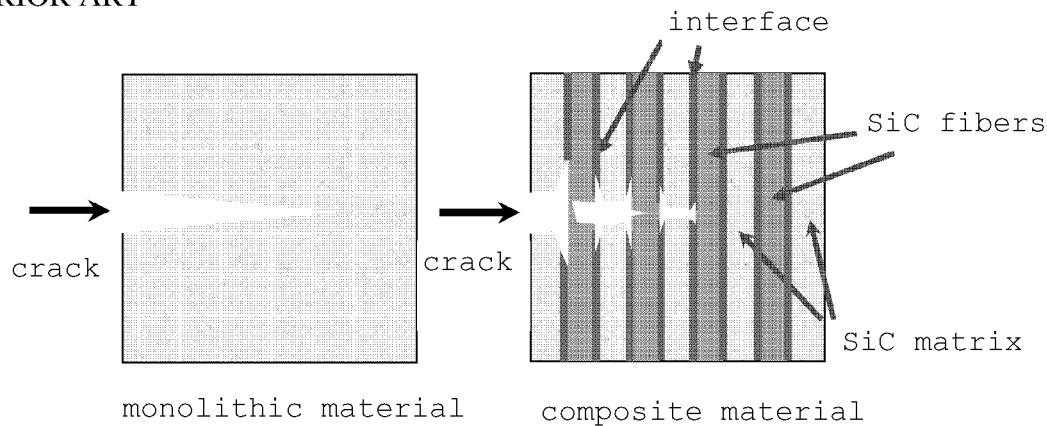
FIG. 1: A schematic diagram showing a fracture toughness improving mechanism according to prior art.

The silicon carbide fiber reinforced silicon carbide composite material (SiC/SiC composite material) of the present invention comprises a multiphase matrix containing a silicon carbide (SiC) phase and a phase containing a substance having low reactivity with respect to silicon carbide (hereinafter may also be referred to as "the second phase"); and silicon carbide (SiC) fibers disposed in the matrix.

The SiC/SiC composite material of the present invention and methods for producing the composite material are specifically explained below.

(1) Matrix

The SiC/SiC composite material of the present invention comprises, as a matrix, a multiphase ceramics containing a SiC phase and a phase (the second phase) containing a substance having low reactivity with respect to silicon carbide.

The individual forms of the SiC phase and the second phase present in the matrix are not particularly limited, insofar as these phases coexist.

For example, the second phase may be a particulate phase distributed in the matrix; otherwise, the SiC phase and the second phase may be in the form of non-uniform-shaped agglomerates present at random in the matrix.

For example, among the later-described production methods, when the liquid phase sintering method is used to produce the SiC/SiC composite material, the second phase is present in the form of particles in the matrix; when the CVI method (chemical vapor infiltration method) is selected as the production method, the SiC phase and the second phase are present at random in the form of non-uniform-shaped agglomerates.

In both of these cases, the binding strength between the matrix and the SiC fibers moderately decreases, thus increasing the toughness; further, an effect of preventing the second phase from oxidation can be exerted.

The substance having low reactivity with respect to silicon carbide for constituting the second phase is not particularly limited, insofar as it is a substance stable under the environment of target usage and is not strongly reactive with SiC.

For example, carbon, nitrides, oxides, carbides, borides, silicates and the like may be used.

Examples of the substance for constituting the second phase having low reactivity with respect to silicon carbide include carbon (graphite); nitrides such as boron nitride (BN) or tantalum nitride (TaN); oxides such as $Cr_2O_3$, $ZrO_2$, $HfO_2$ or CaO; carbides such as ZrC, NbC, or HfC; and borides such as $TiB_2$, $ZrB_2$, or $CrB_2$.

Oxide ceramic particles may be used as the substance for constituting the second phase. For oxide ceramic particles, highly heat-resistant and environmentally resistant oxide ceramic particles having a thermal expansion coefficient in the range of 3 to $8[\times 10^{-6}/K]$ are preferably used.

Silicates are preferably used as oxide ceramic particles.

As silicates, yttrium silicate ($Y_2SiO_5$), erbium silicate ($ErSiO_5$), lutetium silicate ($LuSiO_5$), ytterbium silicate ($Yb_2SiO_5$, and, $Yb_2Si_2O_7$), scandium silicate ($Sc_2Si_2O_7$), and other rare earth silicates are preferably used.

Examples of silicates include aluminosilicate, magnesium silicate, and other various silicates, barium-strontium aluminosilicate (BSAS), and the like.

These substances for constituting the second phase may be used solely, or in a combination of two or more.

The ratio of the SiC phase to the second phase (the phase containing a substance having low reactivity with respect to silicon carbide) is not particularly limited.

The proportion by volume of the SiC phase is preferably about 20 to 90 volume %, more preferably about 40 to 70 volume %, based on the entire matrix.

Within this range, the effect of deflecting the crack propagation along with the fiber direction and the effect of improving the strength obtained by a combination with the SiC fibers are exerted with a good balance.

(2) SiC Fibers

Highly crystalline silicon carbide fibers commercially available under the trade names of, for example, Tyranno SA (Ube Industries, Ltd.), Hi-Nicalon-S (Nippon Carbon Co., Ltd.), and the like, and fibers with lower crystallinity may be used as SiC fibers.

In particular, highly crystalline silicon carbide fibers are advantageous in that they have a high heat-resistant temperature.

The shape of the SiC fibers is not particularly limited; for example, long fibers, which are continuous fibers of SiC fibers; short fibers obtained by cleaving long fibers; and the like may be used.

In particular, in order to improve the fracture toughness, which is an object of the present invention, long fibers of SiC fibers are preferably used.

Insofar as the long fibers are continuous fibers, the fiber length is not particularly limited.

For example, fibers having a length similar to that of the composite material, i.e., the final target object, may be used; however, insofar as sufficient strength can be imparted, long fibers shorter than the target composite material may be used.

Short fibers are obtained by cleaving long fibers, and have a length of, for example, about 1 to 10 mm.

The diameter of the SiC fibers is not particularly limited; for example, fibers having a diameter of about 5 to 200 µm may be used.

The SiC fibers are generally provided as a fiber bundle of about 500 to 2000 fibers, or as a fiber structure using the bundle, such as knitted fabric or woven fabric.

In the present invention, such bundled SiC fibers, a fiber structure of SiC fibers, and the like may be used according to the shape or the like of the target complex.

In particular, considering the production efficiency, it is preferable to use SiC fibers in the form of a fiber structure such as woven fabric.

(3) Method for Producing SiC/SiC Composite Material

The method for producing the SiC/SiC composite material of the present invention is not particularly limited.

For example, the SiC/SiC composite material of the present invention may be produced by the following liquid phase sintering method, the chemical vapor infiltration method (CVI method), the reaction sintering method, or the like.

(i) Liquid Phase Sintering Method

In the liquid phase sintering method, the powdery raw materials are dispersed in a dispersion medium to obtain a slurry, and the slurry is mixed with SiC fibers disposed in a predetermined form to obtain a mixture used for sintering, after which the mixture is sintered, thereby obtaining a SiC/SiC composite material.

Among the raw materials used for the liquid phase sintering method, SiC powder may be used as the raw material for forming the SiC phase.

The particle diameter of the SiC powder is not particularly limited insofar as the SiC powder is fine particles capable of forming a uniform slurry.

For example, fine powder having an average particle diameter of about 0.02 to 20 µm may be used. The kind of SiC is not particularly limited.

For example, cubic crystal powder such as β-sic powder, hexagonal crystal powder such as α-SiC powder, and the like may be used.

The raw material for forming the second phase is also not particularly limited, and powder of a substance having low reactivity with respect to silicon carbide that is stable under usage environment, such as boron nitride, a carbon material, and the like, may be used.

Among them, for example, powder of, for example, graphite, may be used as a carbon material. The particle diameter of the raw material is also not particularly limited. For example, powder having a particle diameter similar to that of the SiC raw material may be used.

The slurry containing powdery raw materials may be obtained by evenly dispersing SiC powder and the raw material for forming the second phase, i.e., powder of BN and/or carbon material, using, as a dispersion medium, water or organic solvents such as alcohol (ethanol, isopropanol, etc.) and the like.

The concentration of the powdery raw materials in the slurry is not particularly limited, and a concentration enabling easy handling is selected.

The concentration is, for example, as a solids content, preferably about 5 to 50 wt %, more preferably about 10 to 30 wt %.

The ratio of the SiC powder to the powder of the raw material for forming the second phase may be the same as the ratio of the SiC phase and the second phase in the target SiC/SiC composite material.

Subsequently, the slurry thus prepared above and the SiC fibers are mixed to produce a mixture used for sintering.

A specific example of the method for producing a mixture of powdery raw materials and SiC fibers used for sintering is a method in which a fiber structure, such as knitted fabric or woven fabric, of SiC fibers are used, and the slurry is applied to the fiber structure of the SiC fibers to infiltrate in the structure.

Further, when bundled ceramic fibers are used, a slurry in which raw material powders are dispersed is placed in a mold, and the bundled SiC fibers are disposed therein in an arbitrary form. In this case, the disposition of the bundled SiC fibers is not limited to disposition in a single direction. The bundled SiC fibers may be disposed in two intersecting directions, or other arbitrary directions.

Further, the slurry containing powdery raw materials may be dried and shaped into a sheet, and may then be formed into a laminate together with a fiber structure of SiC fibers, thereby obtaining a mixture used for sintering.

Further, when bundled ceramic fibers are used, the bundled SiC fibers may be disposed corresponding to the state of SiC fibers in the target composite material, followed by lamination of the layer of the disposed bundled SiC fibers with the sheet-shaped slurry layer, thereby obtaining a mixture used for sintering.

Depending on the thickness of the target composite material, it is possible to laminate two or more layers of each of the sheet-shaped slurry layer and the layer of SiC fibers.

In this case, the direction in which the SiC fibers are oriented may vary for each layer. This makes it possible to further increase the strength.

Further, if necessary, aluminum oxide powder ($Al_2O_3$), yttrium oxide powder, and the like may be added as sintering adjuvants to the mixture before sintering.

For example, the sintering adjuvant may be added to a slurry containing powdery raw materials.

The amount of the sintering adjuvant is, for example, about 0.1 to 25 parts by weight based on the total amount, i.e., 100 parts by weight, of the SiC powder and the powder of a raw material for forming the second phase contained in the slurry.

By adding a sintering adjuvant, it is possible to impart sufficient fracture strength even when the sintering temperature is low.

By preparing a mixture of the raw material for forming the matrix phase and SiC fibers in the manner described above, and sintering the mixture under elevated pressure, the target SiC/SiC composite material is obtained.

The sintering temperature is generally about 1400° C. or more; however, to impart sufficient fracture strength, the sintering temperature is preferably about 1700° C. or more.

By adding a sintering adjuvant, sufficient fracture strength can be imparted even at a sintering temperature of, for example, about 1600° C.

The upper limit of the sintering temperature may be set corresponding to the heat-resistant temperature of SiC fibers to be reinforced. When highly crystalline silicon carbide fibers are used, the upper limit of the sintering temperature is preferably about 2000° C.

The pressure upon sintering is not particularly limited. As the pressure increases, sufficient strength can be imparted in a shorter time.

The pressure is generally about 5 MPa or more, particularly preferably about 10 to 30 MPa.

An inert gas atmosphere using nitrogen, argon, helium or the like is preferable for the atmosphere upon sintering.

In particular, when the matrix phase-forming raw material includes a carbon material, it is preferable to perform sintering in an inert gas atmosphere or reducing atmosphere so as to prevent oxidation of the carbon material upon sintering.

(ii) Chemical Vapor Infiltration (CVI)

In the chemical vapor infiltration method, a gaseous precursor for forming a matrix is introduced in a SiC fiber aggregate, followed by thermal decomposition, thereby precipitating the resulting product on the SiC fiber surface.

More specifically, an aggregate of SiC fibers is disposed in a reactor; a mixed gas for vapor deposition, which is obtained by mixing the SiC precursor gas for forming the SiC phase and the precursor gas for forming the second phase, is supplied to the reactor; and the mixed gas for vapor deposition is heated to a temperature at which both the SiC precursor gas and the precursor gas for forming the second phase undergo thermal decomposition, thereby vapor-depositing on the SiC fiber surfaces SiC generated by the thermal decomposition of the SiC precursor gas and a substance having low reactivity with respect to silicon carbide generated by the decomposition of the precursor gas for forming the second phase.

The aggregate of SiC fibers is not particularly limited, and fiber structures such as bundled SiC fibers, or knitted or woven fabric of SiC fibers, may be used.

Examples of gaseous SiC precursor include methyltrichlorosilane, ethyltrichlorosilane, and mixtures thereof.

Among the precursors of the substances for forming the second phase, examples of carbon precursors include methane, ethane, propane, propylene, and mixtures thereof. Examples of BN precursors include mixed gases including boron and nitrogen, such as a mixed gas of boron trichloride ($BCl_3$) and ammonia ($NH_3$).

These precursor gases are generally introduced into a reactor together with various carrier gases. Examples of carrier gas include $H_2$ gas, Ar gas, and $N_2$ gas.

The composition of the matrix phase may be adjusted by changing the ratio of the SiC precursor gas to the second phase precursor gas.

With this method, a matrix in which the SiC phase and the second phase are mixed is formed, and the SiC fibers are embedded in the matrix.

(iii) Reaction Sintering Method

In the reaction sintering method, a matrix-forming material, which contains powder containing a carbon component, Si powder, and powder of a substance for forming the second phase, is used as a slurry, the slurry is mixed with SiC fibers disposed in a predetermined form to obtain a mixture used for sintering, and the mixture is heated to a temperature equal to or greater than the melting point of silicon, thereby reacting carbon and Si.

As a result, a matrix in which the SiC phase and the second phase are mixed is formed. With this method, the SiC fibers are embedded in the matrix. The target SiC/SiC composite material may thus be obtained.

Among the raw materials for producing a slurry, for the powder containing a carbon component, carbon powder is generally used; however, resins that are carbonized at a temperature equal to or lower than the melting point of silicon, such as phenol resin, may also be used.

When resin powder is used as the powder containing a carbon component, in the step of heating to a temperature equal to or greater than the melting point of silicon, the resin is carbonized before the temperature reaches 1414°, i.e., the melting point of silicon; and, when the temperature reaches the melting point of silicon, the component resulting from the carbonization of the resin and the melted silicon is reacted to form SiC.

For the powder of the substance for forming the second phase, powder of the substance having low reactivity with respect to silicon carbide described above may be used.

Since the powder containing a carbon component and Si powder are used as raw materials in the reaction sintering method, it is necessary to use a substance also having a low reactivity with respect to Si and carbon.

Examples of such a substance include carbides such as ZrC, NbC, or HfC.

When the amount of the carbon component in the powder containing a carbon component used as a raw material falls above the amount required to cause a reaction with Si to thereby form SiC, a carbon phase as the second phase is formed by the excessive carbon component.

SiC powder may be further added to the slurry containing matrix phase-forming raw materials.

By adding SiC powder to the slurry, SiC powder serves as nuclei, and SiC generated by the reaction grows around the nuclei, thereby forming a multiphase matrix containing a SiC phase and the second phase.

This improves the efficiency in forming a matrix phase.

The amount of the SiC powder to be added to the slurry is, for example, about 0.1 to 50 parts by weight based on the total amount, i.e., 100 parts by weight, of the powder containing a carbon component, the Si powder, and the raw material powder for forming the second phase in the slurry.

The particle diameters of the powder containing a carbon component, the Si powder, and the powder of a substance for forming the second phase, the method for forming the slurry, and the like, may be similar to those in the liquid phase sintering method.

The mixing ratio of the components may be similar to the ratio of the respective phases in the target matrix phase. However, it is also possible to form a matrix phase having an elaborate structure by adding an excess amount of Si relative to the carbon component.

The method for producing the mixture of the matrix phase-forming raw materials and the SiC fibers to be used for reaction sintering may also be similar to that of the liquid phase sintering method.

After producing the mixture of the matrix phase-forming raw materials and the SiC fibers by the method described above, SiC is formed by heating the mixture to a temperature equal to or greater than the melting point of silicon so as to react carbon with Si, thereby forming a multiphase matrix containing a SiC phase and the second phase.

The heating temperature may be about 1414° C. or more, which is the melting point of silicon; however, to impart sufficient fracture strength, the heating temperature is preferably about 1500° C. or more.

The upper limit of the heating temperature is set to the heat-resistant temperature of SiC fibers to be reinforced.

When highly crystalline silicon carbide fibers are used, the upper limit of the heating temperature is preferably about 2000° C.

The atmosphere during the heating is preferably vacuum atmosphere.

(4) SiC/SiC Composite Material

With the method described above, the silicon carbide fiber reinforced silicon carbide composite material (SiC/SiC composite material) of the present invention is obtained.

The composite material comprises a multiphase matrix containing a silicon carbide (SiC) phase and a phase (the second phase) containing a substance having low reactivity with respect to silicon carbide, and silicon carbide (SiC) fibers disposed in the matrix.

In this matrix, the SiC phase and the second phase are mixed. Depending on the production method, the matrix has a state in which the second phase in the form of particles are dispersed, or a state in which the second phase and the SiC phase in the form of non-uniform-shaped agglomerate are mixed.

When a slurry in which a powdery raw material dispersed in a dispersion medium is used as a raw material of the matrix, and a fiber structure such as knitted fabric of woven fabric is used as a raw material of SiC fibers, the composite material has a structure having a lamination of the layer of the matrix and the fiber structure in which a part of the matrix permeates between the SiC fibers.

Further, when bundled SiC fibers are used as SiC fibers, the bundled SiC fibers are embedded in the matrix.

Further, when the composite material is produced by the CVI method, the SiC fibers are embedded in the matrix in which the second phase and a SiC phase in the form of an agglomerate are mixed.

Depending on the disposing pattern of the SiC fibers, the composite material of the present invention may have a non-reinforced portion in which the SiC fibers are not disposed in the matrix, in addition to the reinforced portion in which the SiC fibers are disposed in the matrix.

The content of the SiC fibers is not particularly limited; however, the content is set in a range such that a desired sufficient fracture strength can be imparted and the characteristics of the multiphase matrix ceramics containing a SiC phase and the second phase are not inhibited.

Thus, the proportion by volume of the SiC fibers is preferably about 20 to 90%, more preferably about 30 to 80%, based on the entire composite material.

The SiC/SiC composite material having the structure described above has, in the matrix, the second phase containing a substance having low reactivity with respect to silicon carbide, in addition to the SiC phase.

Therefore, the binding strength between the matrix and SiC fibers moderately decreases compared with the composite material having a matrix formed only of SiC.

As a result, if cracks are generated in the matrix, the cracks can be prevented from propagating to the SiC fibers; instead, the cracks can be deflected along the fiber direction.

Further, due to the slippage in the interface with the SiC fibers, pull-out of the SiC fibers, and the like, a behavior called pseudoductility, which is similar to ductility, is exhibited, thereby ensuring a high fracture toughness.

In particular, when a phase with excellent oxidation resistance, such as a BN phase, is formed as the second phase, the oxidation of the second phase is inhibited even in a high-temperature oxidizing atmosphere, thereby retaining significantly superior strength characteristics.

The present invention is described in more detail below with reference to Examples.

Example 1

As SiC fibers, a laminate having a thickness of about 3 mm formed by laminating 14 plain-woven sheets each obtained by repeating alternate ups and downs of warp yarns and weft yarns of 1600 bundles silicon carbide continuous fibers having a fiber diameter of about 7.5 μm (trade name: Tyranno SA fiber, Ube Industries, Ltd.) was used.

The laminate was placed in a furnace for a chemical gas phase infiltration (CVI) treatment.

As a reaction gas, a mixed gas obtained by mixing methyltrichlorosilane as a SiC precursor gas and methane gas as a carbon precursor at a ratio of 1:1 (molar ratio) was supplied to the furnace, together with a mixed gas of $H_2$ and Ar as a carrier gas, followed by heating at 900 to 1100° C.

Through this step, SiC generated by thermal decomposition of methyltrichlorosilane and carbon generated by thermal decomposition of methane gas were vapor-deposited on the outer periphery of the lamination sheet of silicon carbide continuous fibers.

Through this step, a SiC/SiC composite material in which a laminate of silicon carbide continuous fiber sheets is disposed in a multiphase matrix containing a SiC phase and a carbon phase was obtained.

Figure 2:
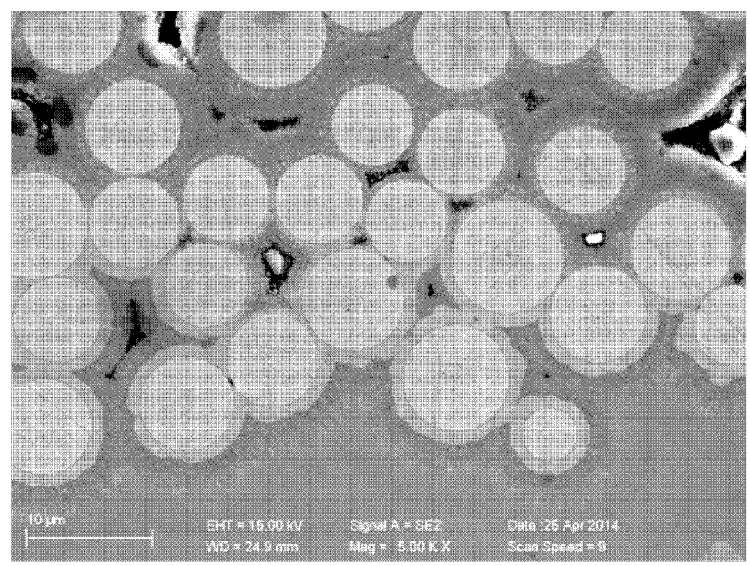
FIG. 2: A scanning electron microscope image of a SiC/SiC composite material obtained in Example 1.

FIG. 2 shows a scanning electron microscope image showing the cross-section of the obtained composite material.

In FIG. 2, the round-shaped objects are silicon carbide fibers, and a matrix in which SiC and C are mixed is formed around the fibers.

When a C interfacial phase is present between the fibers and the matrix, a high-contrast layer can be seen around the fibers; however, in FIG. 2, a high-contrast image not as dense as C phase but denser than SiC can be seen in the entire matrix.

The results of the analysis of the composition confirmed that a mixed layer of SiC and C is formed in this portion.

The tensile strain and tension stress of the SiC/SiC composite material before the composite material eventually fractured were measured using a tensile test.

A tensile test was performed using a rectangular specimen having a length of 40 mm, a width of 4 mm, and a thickness of 2 mm, and a linear-shaped surface load-type specimen having a gauge length of 20 mm.

The test was performed at room temperature at a cross-head speed of 0.5 mm/min.

The tensile strain is expressed by the following equation, wherein $L_0$ is the length of the specimen before the test, and $L_1$ is the length of the specimen under load.

Tensile strain (%)=$[(L_1-L_0)/L_0] \times 100$

The tensile stress is expressed by the following equation, wherein F is the tensile-test load, and A is the cross-sectional area of the specimen before the test.

Tensile stress (MPa)=$F/A$

Figure 3:
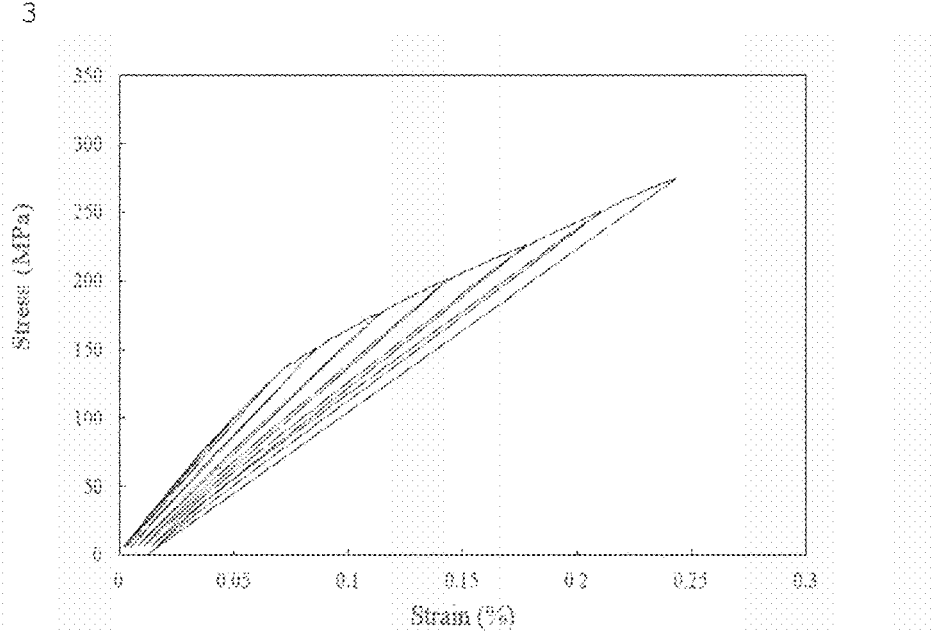
FIG. 3: A graph showing results of a tensile test for a SiC/SiC composite material obtained in Example 1.

FIG. 3 is a graph showing results of a tensile test in which application and removal of load with respect to a specimen of a SiC/SiC composite material was repeated along the same direction as the fiber direction of the SiC fibers.

In this graph, the X-axis indicates the tensile strain (%), and the Y-axis indicates the tensile stress (MPa).

As is clearly shown in FIG. 3, the SiC/SiC composite material obtained by the above method includes an apparent elastic deformation region and an apparent non-elastic deformation region; and has a high strength, which is, as a proportional limit stress, about 150 MPa, and, as a tensile stress, nearly about 280 MPa.

It was thus confirmed that the SiC/SiC composite material exhibits a pseudo-brittle fracture behavior completely different from the brittle fracture in which the material undergoes extension, while maintaining the stress even after the proportional limit stress.

Example 2

A raw material powder containing 65.8 parts by weight of β-SiC powder, which is cubic crystal powder (average particle diameter=0.03 μm; Nanomakers (France)), 2.52 parts by weight of aluminum oxide powder (average particle diameter=0.3 μm; Kojundo Chemical Lab. Co., Ltd.), 1.68 parts by weight of yttrium oxide powder (average particle diameter=0.4 μm, Kojundo Chemical Lab. Co., Ltd.), and 30 parts by weight of BN powder (average particle diameter=0.05 μm, MARUKA) were dispersed in isopropanol to form a slurry.

The amount of isopropanol was 900 parts by weight, based on 100 parts by weight of the raw material powder.

The resulting slurry was applied to a sheet obtained by disposing 1600 bundles of silicon carbide continuous fibers (trade name: Tyranno SA fiber, Ube Industries, Ltd.) having a fiber diameter of about 7.5 μm in a single direction as in Example 1, followed by drying.

17 dried sheets were laminated so that the fibers are oriented in a single direction.

A pressure of 30 MPa was applied to the resulting laminate, and the laminate was subjected to sintering in a high-purity argon atmosphere at a sintering temperature of 1600° C. using a spark plasma sintering device.

Through this step, a SiC/SiC composite material in which a laminate of silicon carbide continuous fiber sheets are disposed in a multiphase matrix containing a SiC phase and a BN phase was obtained. The fiber volume content of this SiC/SiC composite material was about 55%.

This composite material was subjected to a tensile test under the same specimen size and conditions as those in Example 1.

Figure 4:
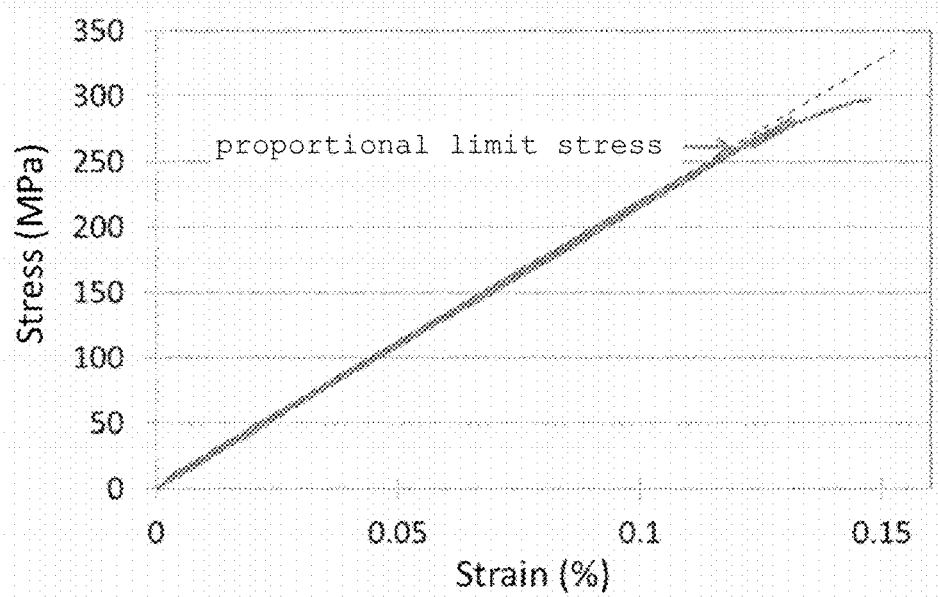
FIG. 4: A graph showing results of a tensile test for a SiC/SiC composite material obtained in Example 2.

FIG. 4 is a graph showing results of a tensile test when the composite material was pulled in the same direction as the fiber direction of the SiC fibers.

As is clearly shown in FIG. 4, the SiC/SiC composite material obtained by the above method had a high strength, which is, as a proportional limit stress, about 250 MPa; and, as a tensile stress, nearly about 300 MPa.

It was thus confirmed that, as in Example 1, the composite material exhibits a pseudo-brittle fracture behavior completely different from the brittle fracture in which the material undergoes extension, while maintaining the stress even after the proportional limit stress.

Figure 5:
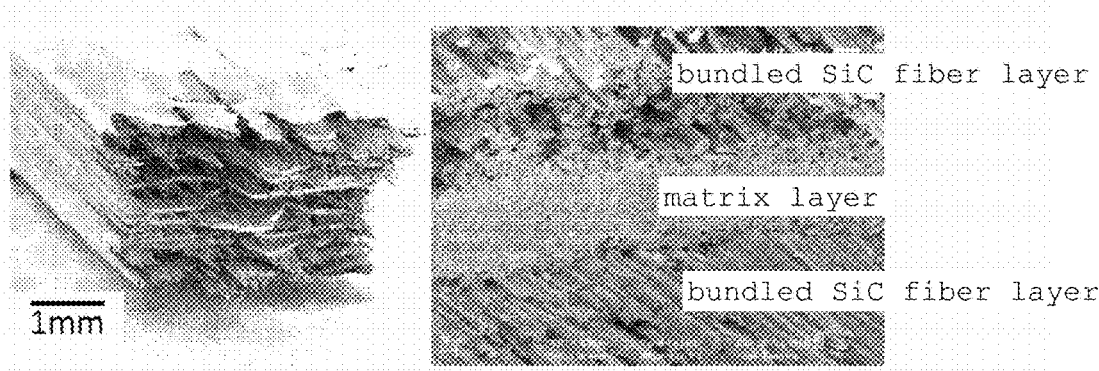
FIG. 5: A scanning electron microscope fractograph of a SiC/SiC composite material obtained in Example 2 after a tensile test.

FIG. 5 is a fractograph of a specimen after a tensile test, taken by a scanning electron microscope.

FIG. 5 confirmed that this composite material had a structure having a laminate of a bundled SiC fiber layer and a matrix layer.

FIG. 5 also confirmed pull-out of fibers that is typically observed in fiber-reinforced composite materials.

A SiC/SiC composite material in which BN particles are dispersed was produced in a similar manner, and the composite material was subjected to an exposure test at 1500° C. under atmospheric air and then subjected to a tensile test.

Figure 6:
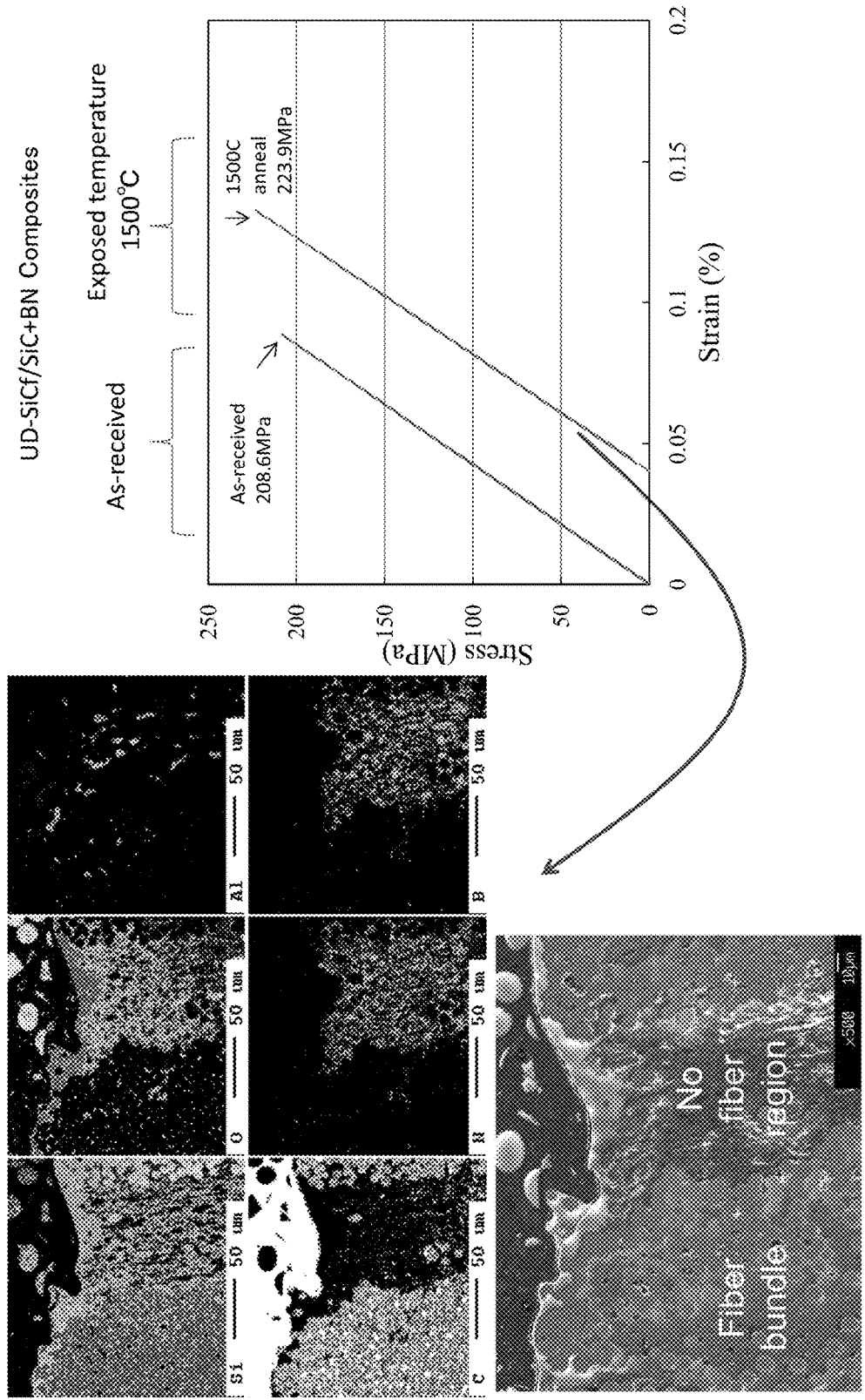
FIG. 6: A drawing showing a microtissue and tensile stress characteristics of a BN particle-dispersed SiC composite material after exposure to 1500° C. and annealing in the air.

As shown in the right diagram of FIG. 6, a decrease in strength was not observed.

As shown in the left diagram of FIG. 6, the results of the observation of the tissue in the vicinity of the sample surface after the exposure to a high temperature revealed that a gentle oxygen concentration gradient formed by oxidation was observed from the surface in a region not containing fibers.

Further, in the bundled fiber region, oxidation was propagated only to regions 10 to 20 μm from the surface.

Figure 7:
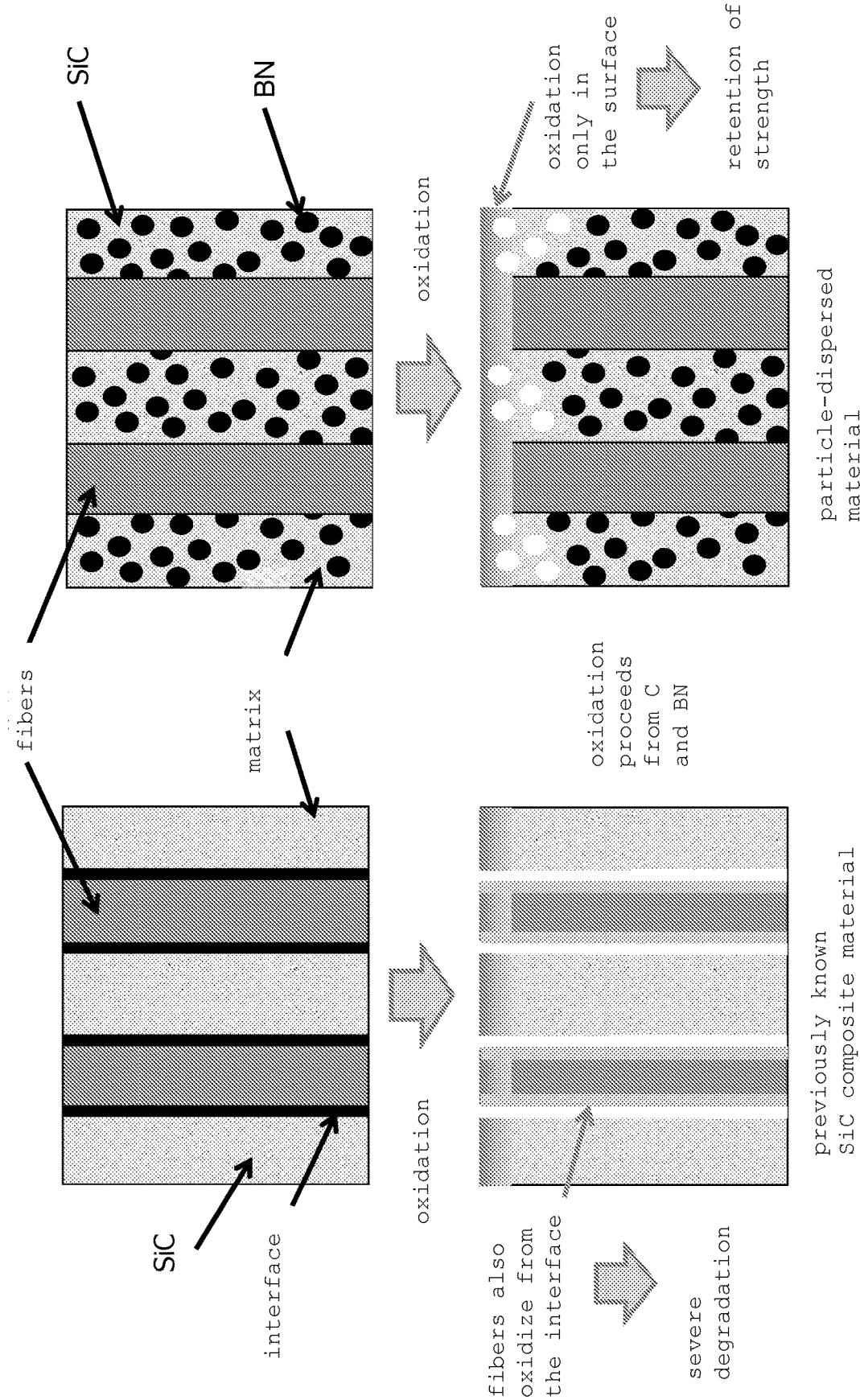
FIG. 7: A drawing showing a comparison in terms of oxidation behavior of SiC composite materials.

As shown in FIG. 7, in a previously known material having an interfacial phase between the fibers and the matrix, oxidation was propagated along the interface.

It is assumed that, in the particle-dispersed SiC/SiC composite material of the present invention, since the oxidation was suppressed near the surface, the strength of the SiC/SiC composite material was maintained even after the exposure to atmosphere.

The invention claimed is:

1. A silicon carbide fiber reinforced silicon carbide composite material, comprising a multiphase matrix and silicon carbide fibers disposed in the matrix, the matrix including a silicon carbide phase and a phase that contains a substance of low reactivity with respect to silicon carbide,
   wherein
   the substance is at least one member selected from the group consisting of graphite, BN, TaN, $Cr_2O_3$, $ZrO_2$, $HfO_2$, ZrC, NbC, HfC, $TiB_2$, $CrB_2$, $Y_2SiO_5$, $Yb_2SiO_5$, $Yb_2Si_2O_7$, $ErSiO_5$, $LuSiO_5$, $Sc_2Si_2O_7$, aluminosilicate, magnesium silicate, and barium-strontium aluminosilicate;
   the matrix has a structure in which the phase containing the substance is dispersed in the form of particles in the matrix, or a structure in which the silicon carbide phase and the phase containing the substance are present at random in the form of non-uniform-shaped agglomerates in the matrix;
   the silicon carbide fibers are silicon carbide long fibers;
   the silicon carbide phase consists of Si and C; and
   an interfacial phase is not present between the silicon carbon fibers and the matrix.

2. The silicon carbide fiber reinforced silicon carbide composite material according to claim 1, wherein the content percentage of the silicon carbide fibers is 20 to 90 volume % based on the entire composite material.

3. A method for producing a silicon carbide fiber reinforced silicon carbide composite material, comprising dispersing silicon carbide powder and powder of a substance having low reactivity with respect to silicon carbide in a dispersion medium to obtain a slurry; applying the slurry to a fiber structure of silicon carbide fibers to obtain a mixture; and then sintering the mixture under elevated pressure,
   wherein the substance is at least one member selected from the group consisting of graphite, BN, TaN, $Cr_2O_3$, $ZrO_2$, $HfO_2$, ZrC, NbC, HfC, $TiB_2$, $CrB_2$, $Y_2SiO_5$, $Yb_2SiO_5$, $Yb_2Si_2O_7$, $ErSiO_5$, $LuSiO_5$, $Sc_2Si_2O_7$, aluminosilicate, magnesium silicate, and barium-strontium aluminosilicate;

the silicon carbide fiber reinforced silicon carbide composite material contains a multiphase matrix and the silicon carbide fibers disposed in the matrix, the matrix including a silicon carbide phase and a phase that contains the substance;

the matrix has a structure in which the phase containing the substance is dispersed in the form of particles in the matrix;

the silicon carbide fibers are silicon carbide long fibers;

the silicon carbide phase consists of Si and C; and an interfacial phase is not present between the silicon carbon fibers and the matrix.

4. A method for producing a silicon carbide fiber reinforced silicon carbide composite material, comprising dispersing silicon carbide powder and powder of a substance having low reactivity with respect to silicon carbide in a dispersion medium to obtain a slurry; disposing bundled silicon carbide fibers in the slurry to obtain a mixture; and then sintering the mixture under elevated pressure, wherein the substance is at least one member selected from the group consisting of graphite, BN, TaN, $Cr_2O_3$, $ZrO_2$, $HfO_2$, ZrC, NbC, HfC, $TiB_2$, $CrB_2$, $Y_2SiO_5$, $Yb_2SiO_5$, $Yb_2Si_2O_7$, $ErSiO_5$, $LuSiO_5$, $Sc_2Si_2O_7$, aluminosilicate, magnesium silicate, and barium-strontium aluminosilicate;

the silicon carbide fiber reinforced silicon carbide composite material contains a multiphase matrix and the silicon carbide fibers disposed in the matrix, the matrix including a silicon carbide phase and a phase that contains the substance;

the matrix has a structure in which the phase containing the substance is dispersed in the form of particles in the matrix;

the silicon carbide fibers are silicon carbide long fibers;

the silicon carbide phase consists of Si and C; and an interfacial phase is not present between the silicon carbon fibers and the matrix.

5. A method for producing a silicon carbide fiber reinforced silicon carbide composite material, comprising drying a slurry containing silicon carbide powder and powder of a substance having low reactivity with respect to silicon carbide and molding into a sheet; forming a laminate by laminating thereon a fiber structure made of silicon carbide fibers or a layer in which bundled silicon carbide fibers are disposed; and then sintering the laminate under elevated pressure, wherein the substance is at least one member selected from the group consisting of graphite, BN, TaN, $Cr_2O_3$, $ZrO_2$, $HfO_2$, ZrC, NbC, HfC, $TiB_2$, $CrB_2$, $Y_2SiO_5$, $Yb_2SiO_5$, $Yb_2Si_2O_7$, $ErSiO_5$, $LuSiO_5$, $Sc_2Si_2O_7$, aluminosilicate, magnesium silicate, and barium-strontium aluminosilicate;

the silicon carbide fiber reinforced silicon carbide composite material contains a multiphase matrix and the silicon carbide fibers disposed in the matrix, the matrix including a silicon carbide phase and a phase that contains the substance;

the matrix has a structure in which the phase containing the substance is dispersed in the form of particles in the matrix;

the silicon carbide fibers are silicon carbide long fibers;

the silicon carbide phase consists of Si and C; and an interfacial phase is not present between the silicon carbon fibers and the matrix.

6. A method for producing a silicon carbide fiber reinforced silicon carbide composite material, comprising disposing a silicon carbide fiber aggregate in a reactor; supplying a mixed gas for vapor deposition containing a silicon carbide precursor gas for forming a silicon carbide phase and a second phase-forming precursor gas for forming a phase comprising a substance having low reactivity with respect to silicon carbide to the reactor; and heating the mixed gas for vapor deposition to a temperature at which both the silicon carbide precursor gas for forming the silicon carbide phase and the second phase-forming precursor gas undergo thermal decomposition, thereby vapor-depositing on the surfaces of the silicon carbide fibers the silicon carbide and the substance having low reactivity with respect to silicon carbide, wherein the substance is at least one member selected from the group consisting of graphite, BN, TaN, $Cr_2O_3$, $ZrO_2$, $HfO_2$, ZrC, NbC, HfC, $TiB_2$, $CrB_2$, $Y_2SiO_5$, $Yb_2SiO_5$, $Yb_2Si_2O_7$, $ErSiO_5$, $LuSiO_5$, $Sc_2Si_2O_7$, aluminosilicate, magnesium silicate, and barium-strontium aluminosilicate;

the silicon carbide fiber reinforced silicon carbide composite material contains a multiphase matrix and the silicon carbide fibers disposed in the matrix, the matrix including the silicon carbide phase and the phase that contains the substance;

the matrix has a structure in which the silicon carbide phase and the phase containing the substance are present at random in the form of non-uniform-shaped agglomerates in the matrix;

the silicon carbide fibers are silicon carbide long fibers;

the silicon carbide phase consists of Si and C; and an interfacial phase is not present between the silicon carbon fibers and the matrix.

7. A method for producing a silicon carbide fiber reinforced silicon carbide composite material, comprising dispersing a matrix-forming material containing powder containing a carbon component, Si powder, and powder of a substance having low reactivity with respect to silicon carbide in a dispersion medium to obtain a slurry; mixing the slurry with SiC fibers to obtain a mixture used for reaction sintering; and then heating the mixture to a temperature equal to or greater than the melting point of silicon, wherein the substance is at least one member selected from the group consisting of graphite, BN, TaN, $Cr_2O_3$, $ZrO_2$, $HfO_2$, ZrC, NbC, HfC, $TiB_2$, $CrB_2$, $Y_2SiO_5$, $Yb_2SiO_5$, $Yb_2Si_2O_7$, $ErSiO_5$, $LuSiO_5$, $Sc_2Si_2O_7$, aluminosilicate, magnesium silicate, and barium-strontium aluminosilicate;

the silicon carbide fiber reinforced silicon carbide composite material contains a multiphase matrix and the silicon carbide fibers disposed in the matrix, the matrix including a silicon carbide phase and a phase that contains the substance;

the matrix has a structure in which the phase containing the substance is dispersed in the form of particles in the matrix;

the silicon carbide fibers are silicon carbide long fibers;

the silicon carbide phase consists of Si and C; and an interfacial phase is not present between the silicon carbon fibers and the matrix.

8. The method for producing a silicon carbide fiber reinforced silicon carbide composite material according to claim 7, wherein the matrix-forming material further comprises SiC powder.

9. The silicon carbide fiber reinforced silicon carbide composite material according to claim 1, wherein the substance is at least one member selected from the group consisting of BN, TaN, $Cr_2O_3$, $HfO_2$, NbC, HfC, $CrB_2$, $Y_2SiO_5$, $Yb_2SiO_5$, $Yb_2Si_2O_7$, $ErSiO_5$, $LuSiO_5$, $Sc_2Si_2O_7$, aluminosilicate, magnesium silicate, and barium-strontium aluminosilicate.

10. The silicon carbide fiber reinforced silicon carbide composite material according to claim 1, wherein the proportion of the silicon carbide phase is 20 to 90 volume % based on the matrix.

11. The silicon carbide fiber reinforced silicon carbide composite material according to claim 1, wherein the substance is at least one member selected from the group consisting of BN, TaN, $Cr_2O_3$, $ZrO_2$, $HfO_2$, ZrC, NbC, HfC, $TiB_2$, $CrB_2$, $Y_2SiO_5$, $Yb_2SiO_5$, $Yb_2Si_2O_7$, $ErSiO_5$, $LuSiO_5$, $Sc_2Si_2O_7$, aluminosilicate, magnesium silicate, and barium-strontium aluminosilicate; and the proportion of the silicon carbide phase is 20 to 90 volume % based on the matrix.

12. The silicon carbide fiber reinforced silicon carbide composite material according to claim 1, wherein the substance is at least one member selected from the group consisting of BN, TaN, $Cr_2O_3$, $ZrO_2$, $HfO_2$, ZrC, NbC, HfC, $TiB_2$, $CrB_2$, $Y_2SiO_5$, $Yb_2SiO_5$, $Yb_2Si_2O_7$, $ErSiO_5$, $LuSiO_5$, $Sc_2Si_2O_7$, aluminosilicate, magnesium silicate, and barium-strontium aluminosilicate.

* * * * *